June 8, 1965  E. H. EVANS  3,187,581
FLOAT-ACTUATED SAMPLER
Filed April 29, 1963  2 Sheets-Sheet 1
FIG. 1
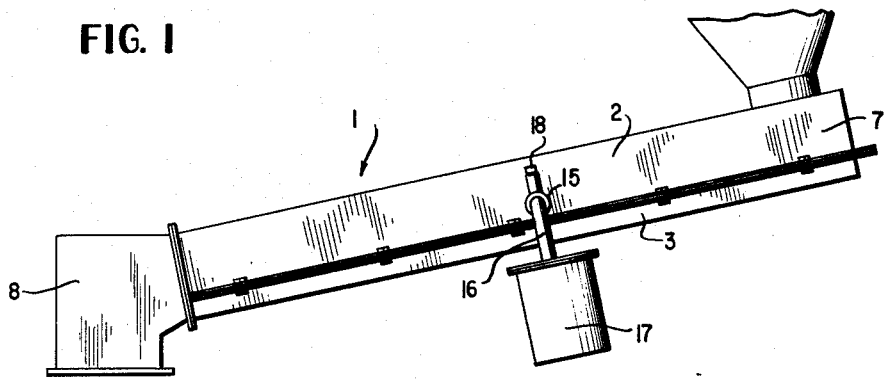
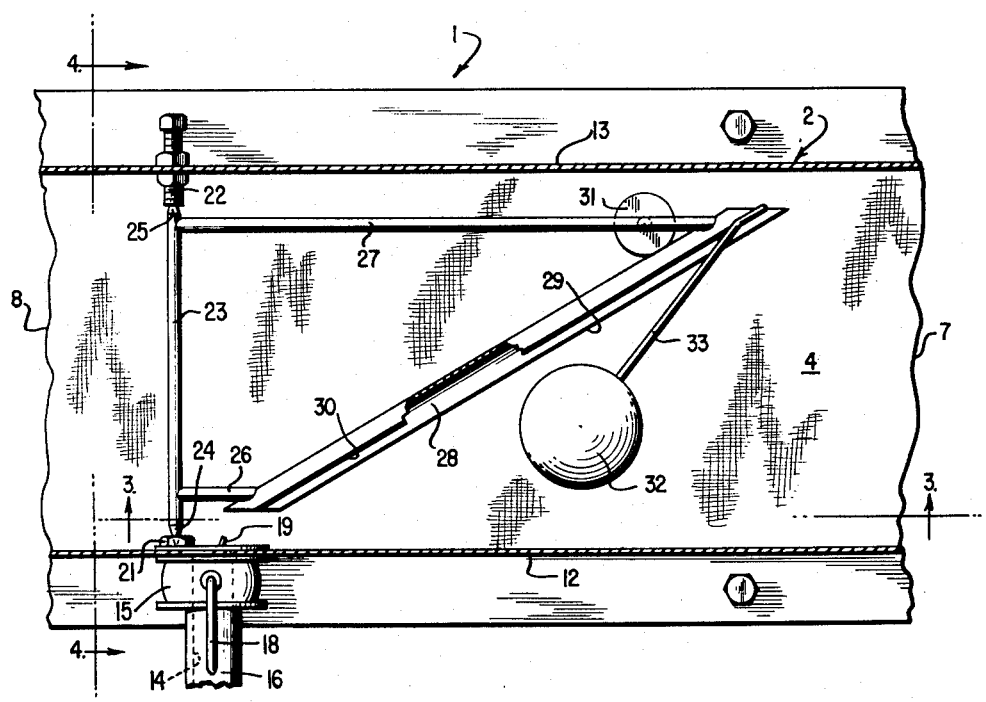
FIG. 2
INVENTOR.
ELMER H. EVANS
BY
ATTORNEYS June 8, 1965  E. H. EVANS  3,187,581
FLOAT-ACTUATED SAMPLER
Filed April 29, 1963  2 Sheets-Sheet 2

INVENTOR.
ELMER H. EVANS
BY
ATTORNEYS

United States Patent Office 3,187,581
Patented June 8, 1965

3,187,581
FLOAT-ACTUATED SAMPLER
Elmer H. Evans, Alpena, Mich., assignor to Huron Portland Cement Company, Detroit, Mich., a corporation of Michigan
Filed Apr. 29, 1963, Ser. No. 276,406
6 Claims. (Cl. 73—422)

This invention relates to an apparatus for taking representative samples of material from flowing streams, and particularly for the taking of such samples from flowing streams of fluidized pulverulent material.

In application Serial No. 180,886, filed March 19, 1962, in my name and in the name of Frank C. Starbuck, there is disclosed an apparatus for the taking of samples of pulverulent material flowing along a fluidizing gravity conveyor in which a sample collecting trough extends diagonally across the material-conveying duct of the conveyor adjacent the bottom thereof. The trough intercepts and directs a portion of the flowing stream of material through a sampling port located in a side wall of the material-conveying duct, so that a sample of the material will be taken from substantially the entire width of the flowing stream of fluidized material.

A sampling device such as is disclosed in the aforesaid application is quite satisfactory where the characteristics of the flowing stream are the same, or substantially the same, throughout the depth thereof, however, in some instances, as for example where the pulverulent material which is being conveyed in a fluidized state is not of substantially uniform fineness, the flowing stream tends to stratify so that a sample of the flowing stream taken at any one level, or at substantially one level, of the material-conveying duct will not be truly representative of the entire stream of material flowing through the conveyor.

The present invention contemplates an apparatus for the taking of samples of material from flowing streams which are representative of the material throughout both its width and depth so that the sample is directly representative of the entire cross-section of the flowing stream.

More particularly, the present invention contemplates a sampling apparatus such as is disclosed in the aforesaid application which has a sample collecting trough extending diagonally across the material-conveying duct, as in said application, but in which the trough is supported by a shaft which extends transversely across the material-conveying duct adjacent the bottom thereof and is mounted in trunnions for rotation about a horizontal axis. A float is attached to the trough. Consequently, when material is flowing through the duct it will raise the float, which in turn will cause the trough to swing upwardly about the axis of its mounting shaft. Since the trough extends diagonally across the material-conveying duct, and the mounting shaft, therefore, is adjacent the bottom of the casing, when the trough is swung upwardly it also will extend in an inclined direction with respect to the depth of the material in the material-conveying duct. Therefore, as the material flows past the trough, the trough will cut from the flowing stream of material a sample taken in both the widthwise and depth direction of the flowing stream. Such a sample will be truly representative of the entire cross-section of the flowing stream, even if stratification has taken place.

The invention will be further described in connection with the accompanying drawings, in which:

FIG. 1 is a side elevational view of a fluidizing gravity conveyor embodying the sampling apparatus of the invention;

FIG. 2 is a horizontal sectional view through a portion of the conveyor of FIG. 1, showing the sampling device in plan view;

Figure 3:
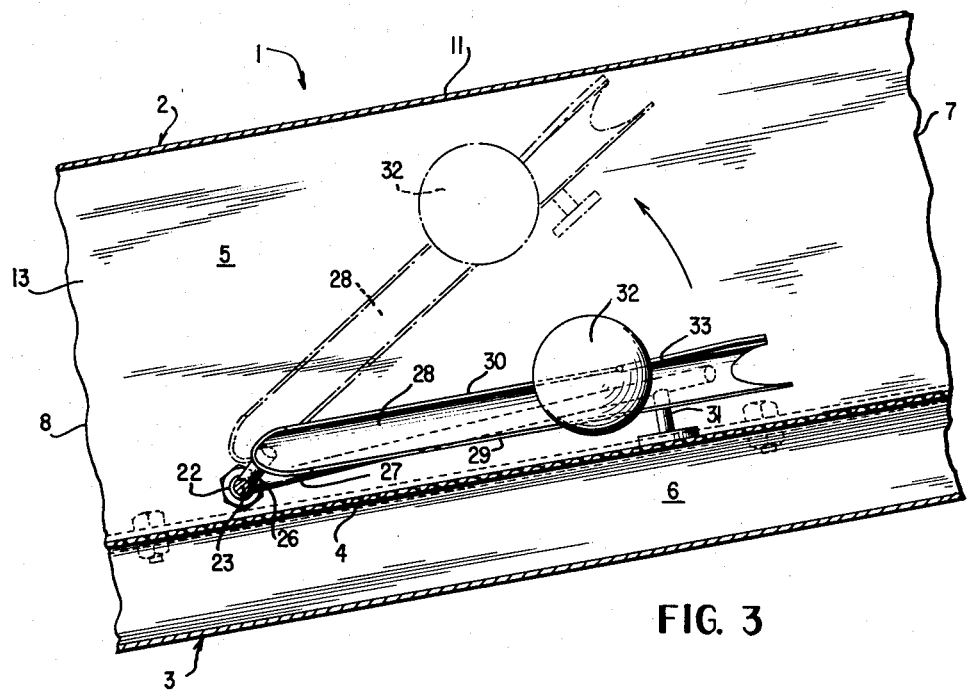
FIG. 3 is a vertical sectional view on line 3—3 of FIG. 2.
Figure 4:
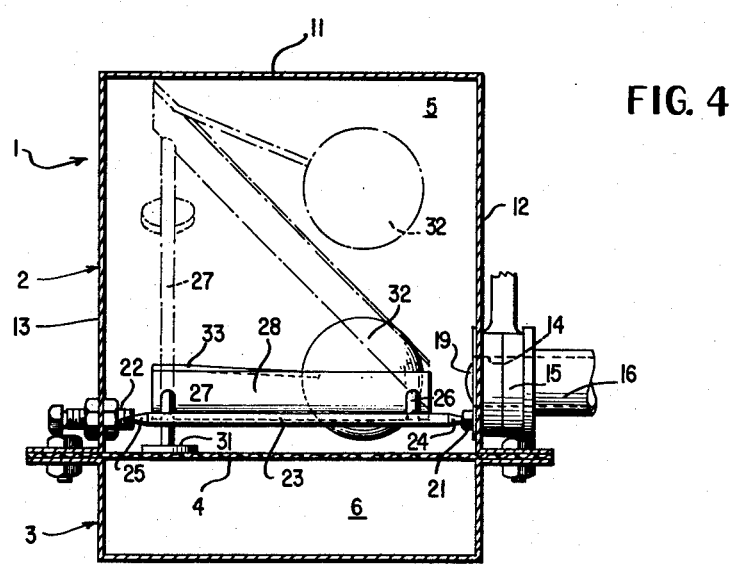
FIG. 4 is a transverse sectional view through the conveyor on line 4—4 of FIG. 2.

Referring to the drawings, the invention is embodied in a fluidizing gravity conveyor of the type set forth in the patent to H. R. Schemm, No. 2,527,455. The conveyor comprises a casing 1 having an upper inverted channel 2 and an underlying lower channel 3 which are bolted to each other at their edges with a gas-permeable deck 4 clamped therebetween. Preferably, the gas-permeable deck is a flexible fabric of uniform, low gas-permeability of the type disclosed in the aforementioned patent. With the gas-permeable deck 4, the upper and lower channels 2 and 3 form, respectively, an upper material-conveying duct 5 and an underlying air duct or plenum chamber 6.

The material-conveying duct 5 receives material at its upper or inlet end 7. The air duct or plenum chamber 6 receives a supply of air or other gas directly from a source of air under pressure or through its open end from an adjacent fluidizing conveyor section, or an aerating zone such as the fluidized outlet of a bin with which the sampler is associated. The air introduced into the air duct or plenum chamber 6 passes upwardly through the gas-permeable deck 4 into the overlying pulverulent material and fluidizes it. The fluidized material flows along the gas-permeable deck 4 to be discharged at the lower end 8 of the conveyor.

The channel 2 forming the material-conveying duct 5 comprises a top wall 11 and a pair of side walls 12 and 13. The side wall 12 has a sampling port 14 therein which communicates via a valve 15 and a pipe 16 with the sample receptacle 17 or other suitable means for receiving a sample of the material passing through the sampling port 14. Various forms or shapes of sampling ports may be utilized.

The valve 15 preferably is of the butterfly type, although, if desired, other types of valves may be used. Preferably, the valve should be self-locking, as by a latch lever 18, and should be located as close as possible to the sampling port 14 to minimize accumulation when the valve is closed. Also, the valve, when in open position, preferably is arranged to have its blade 19 in a scooping position with respect to the general direction of material flowing through the duct 5 and, as shown in FIG. 2, to extend slightly into the material-conveying duct 5 so that material flowing past it will be intercepted and caused to pass through the sampling port. When the valve is in its open position, the blade 19 thereof will have its surface generally aligned with the material flowing from a transversely-extending conveyor trough to be described.

Trunnions 21 and 22 are secured to the sides 12 and 13 of the side walls of the material-conveying duct near the bottom of the duct and form bearings for a transversely-extending shaft 23. The ends of the shaft 23 are tapered, as at 24 and 25. The tapered ends are received in correspondingly shaped countersunk recesses in the inner ends of the trunnions. Trough supporting bars 26 and 27 are welded, or otherwise secured, to the shaft 23 adjacent the respective ends thereof and extend therefrom generally horizontally in the upstream direction with respect to the flow of material through the material-conveying duct 5. A sampling plow or trough 28 is welded, or otherwise secured, adjacent its ends to the respective distal ends of the trough supporting rods 26 and 27. The trough supporting rod 26 is quite short, and extends only a short distance outwardly from the shaft 23, but the trough supporting rod 27 is much longer. Due to this fact, the trough 28 is caused to extend diagonally across the material-conveying duct 5. The length of the trough is such that it extends substantially entirely across the width of the material-conveying duct.

The trough 28 is of generally semi-oval or semi-parabolical shape with the concave face facing upstream with respect to the flow of material through material-conveying duct 5. If desired, the trough could be of other than semi-oval or semi-parabolical shape as long as it presents a concave face facing upstream. The lower side 29 of the trough 28 extends forwardly, that is, upstream, farther than the upper side 30, since, as will hereinafter be described, it provides a conveying surface for sampled material.

The forward end portion of the longer trough supporting rod 27 carries a foot 31 which normally rests on the gas-permeable deck 4 to support the upstream end of the trough a distance above the deck 4 such that the trough normally extends in a generally horizontal direction.

A float 32 is supported by means of a rod 33 from the upstream edge of the trough 28. However, if desired, the float 32 could be attached to one of the trough supporting rods 26 or 27, preferably the longer rod 27. The essential thing is that the float should be operatively connected to the trough to exert a buoyant effect thereon when material is flowing through the material-conveying duct 5. The float has sufficient buoyant effect that when material is flowing through the material-conveying duct 5, it will lift the trough, causing it to swing upwardly about the axis of the shaft 23 so that the upstream end thereof will be lifted substantially to the top or upper surface of the flowing stream of material, as indicated in dotted lines in FIG. 3. When the trough is swung to that position, it not only extends diagonally across substantially the entire width of material-conveying duct 5, but it also extends in an inclined position for substantially the entire depth of the stream of material flowing through the material-conveying duct.

In operation, as the pulverulent material flows through the material-conveying duct 5, the buoyant effect of the float will cause the trough 28 to swing to the dotted line position shown in FIG. 3. In this position the trough will extend, not only diagonally crosswise of the material-conveying duct 5, but also will extend in a downwardly inclined direction, in the direction of flow of material through clined direction, in the direction of flow of material through the duct, for substantially the full depth of the flowing stream. Portions of the flowing stream will be intercepted by the trough 28 and cut from the flowing stream of material. The intercepted portions of the material will be directed downwardly in an inclined direction by the trough 28, and discharged therefrom back into the flowing stream of material adjacent to the side wall 12 and only slightly upstream from the sampling port 14. As the sampled material discharged from the downstream end of the trough 28 begins its downward flow through the material-conveying duct 5, it substantially immediately is intercepted by the protruding portion of the blade 19 of valve 15 and diverted by it into the pipe 16 through which it passes to the sample receptacle 17, from which it can be removed for analysis. Since the trough 28 extends substantially entirely across the width of the flowing stream, and also throughout substantially the full depth thereof, the sample which it cuts from the stream of flowing material will be truly representative of the entire cross-section of the stream of flowing material.

The wider, forwardly-protruding lower side 29 of the trough 28 provides a surface along which the sample of material cut from the flowing stream in the material-conveying duct 5 flows toward the sampling port 14. As the sampled material is carried along the lower side 29 of the trough, any lumps of material in the flowing stream will roll off the free edge of the lower side and will not be discharged from the downstream end of the trough to flow into and possibly clog the sampling port 14 or the pipe 16. Any lumps in the portion of material cut from the flowing stream by the trough 28 will roll off the lower free edge 29 of the trough as they move downwardly therealong and back into the flowing stream, and will not be discharged from the downstream end of the trough to flow into and possibly clog the sampling port 14 or pipe 16.

Various changes may be made in the details of construction of the sampler described herein without departing from the invention, or sacrificing any of the advantages thereof.

I claim:

1. A sampler for flowing streams of material comprising a duct, through which material is adapted to flow, having a wall and having a sampling port in said wall, a shaft mounted for rotation extending crosswise of said duct adjacent to the bottom thereof, a trough facing upstream of said material flow for intercepting and cutting from a stream of material flowing through the duct a sample thereof, means attaching said trough to said shaft for rotation therewith, a float operatively connected to said trough to exert a buoyant force thereon, said shaft and said trough extending at an acute angle to one another, said trough extending transversely of said duct, and having its downstream end adjacent the sampling port, whereby when material is flowing through said duct and said trough is rotated about the axis of said shaft by the buoyant force exerted by said float, said trough will also extend in an inclined position depthwise of said duct, and means for diverting sampled material cut from a stream of material flowing through said duct and discharged from the downstream end of the trough, with respect to flow of material through said duct, towards said sampling port.

2. A sampler as defined in claim 1 in which said shaft extends substantially normal to the side walls of said duct.

3. A sampler as defined in claim 1 in which trunnions are attached to the side walls of the duct, and said shaft is mounted in said trunnions.

4. A sampler as defined in claim 1 which includes trough supports attached to said shaft and extending therefrom in the upstream direction with respect to flow of material through said duct, the trough is attached to the distal end portions of said trough supports, and said trough supports are of unequal length.

5. A sampler as defined in claim 4 in which the downstream end of said trough terminates adjacent said shaft.

6. A sampler as defined in claim 5 in which the float is attached to said trough adjacent the upstream end thereof.

References Cited by the Examiner

UNITED STATES PATENTS

| 2,527,394 | 10/50 | Browne | 302—29 |
| 2,675,706 | 4/54 | Edgar | 73—421 |
| 2,872,818 | 2/59 | Johnson | 73—423 |
| 2,968,948 | 1/61 | Rose | 73—421 |

SAMUEL F. COLEMAN, *Primary Examiner.*

ANDRES H. NIELSEN, *Examiner.*